June 22, 1937. W. ROCKE Re. 20,424

WASHING MACHINE AND METHOD

Original Filed June 14, 1935 2 Sheets-Sheet 1

INVENTOR
William Rocke
BY Jeffs & Jeffs
ATTORNEYS

June 22, 1937. W. ROCKE Re. 20,424

WASHING MACHINE AND METHOD

Original Filed June 14, 1935 2 Sheets-Sheet 2

INVENTOR
William Rocke
BY Jeffs & Jeffs
ATTORNEYS

Reissued June 22, 1937

Re. 20,424

UNITED STATES PATENT OFFICE 20,424

WASHING MACHINE AND METHOD

William Rocke, South Bend, Ind., assignor to Bertha M. Rocke, Bloomington, Ill.

Original No. 2,021,466, dated November 19, 1935, Serial No. 26,557, June 14, 1935. Application for reissue November 12, 1936, Serial No. 111,697

22 Claims. (Cl. 68—37)

This invention is directed to washing machines and means for operating the same and to a method of washing clothes, fabrics and the like.

The invention has for its principal object to provide a washing apparatus capable of thoroughly washing garments or fabrics in a tub without contact thereof with moving parts of the machine.

Another object lies in the provision of a washing process wherein the water and garments or fabrics in a tub are thoroughly agitated without moving parts in the area occupied by the garments or fabrics.

An additional object is to provide a means for actively agitating water and garments or fabrics in a tub without utilizing the conventional dolly.

Another object is to provide a vortex-like turbulent mass of washing liquid with inner concentration and outer diffusion zones through which the clothes or fabrics are circulated so that the clothes or fabrics may be washed effectively and satisfactorily by water action alone.

A further object is to provide a washing apparatus including a tub in which there is disposed means for agitating water therein, which means includes a devise capable of forcibly pumping water into the tub in a manner to cause active turbulence in the water to agitate the same to produce a washing action.

Another object is to provide a washing apparatus as aforesaid including a tub adapted to contain water and garments, or fabrics, a pumping device capable of continuously taking water from the bottom of the tub, forcing the same into an intermediate portion of the tub in a manner to agitate the water therein and return the same to the pump, there being means for separating the garments or fabrics from the water flowing into the pump.

A further object is to provide means for agitating water and garments or fabrics in a tub comprising a rotary pumping mechanism disposed centrally of the tub adapted to continuously circulate the water therein in such a manner that the water is drawn from a sump portion of the tub and forced into the main body of water at a point well below the surface thereof whereby the pumped water is capable of creating a highly turbulent movement in the tub to bring about an efficient washing action.

An additional object is to provide means as aforesaid for forcing water under pressure into the lower part of a tub to agitate the water and means for adjusting the pressure to modify said agitation.

Another object is to provide means as aforesaid, for forcing water under pressure into the lower part of a tub to agitate the water, consisting of mechanism for taking the water from a sump portion of the tub, forcing it upwardly in the central portion of the tub, downwardly toward the bottom of the tub and outwardly against a baffle, which diverts it toward the outside wall of the tub thereby setting up at the bottom of the washing compartment an outward flow of water which is deflected upwardly by the tub wall and causes a water action capable of agitating and washing garments or fabrics while at the same time sufficient water is diverted into the sump to maintain the supply to the water pressure means.

A further object is to provide a washing device as aforesaid, wherein the pumping elements consist of an impeller extending upwardly from the sump portion of the tub, a shaft affixed in the impeller and passing through the bottom of the tub and a driving motor directly connected to said shaft, said shaft having driving connection with a power take off mechanism whereby the washing machine and associated wringer may be driven from a unit power source.

Other objects will appear in the following description and accompanying drawings in which.

Figure 1:
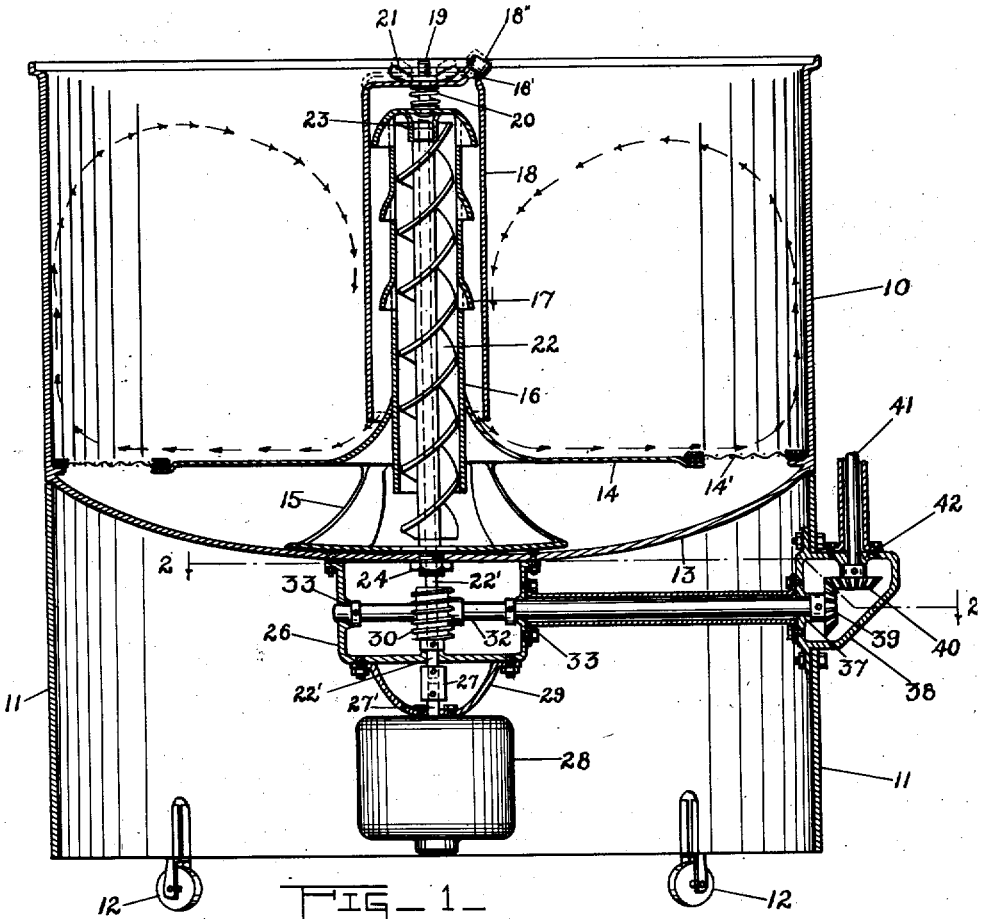
Fig. 1 is a sectional side elevational view showing details of construction to be described.

My washing machine comprises a novel combination of elements including a tub 10 supported by any suitable means such as a skirt structure 11 having castors 12 attached at the lower edges as shown.

The tub has a depressed bottom wall 13 above and centrally of which is a circular baffle plate 14. The baffle plate is supported upon the bottom of the tub by a structure comprising legs 15 secured to the tub in any suitable way. The baffle plate structure includes an upright tube portion 16 which extends from a point somewhat below the baffle to a point preferably above the normal line of water in the tub.

In its upper portion the tube 16 is provided with downwardly directed openings 17 the function of which will be explained shortly.

Surrounding the tube 16 is a cylindrical member 18 which is disposed and dimensioned to extend from a point above the tube 16 to a point near the baffle 14 as shown, with suitable clearance between it and tube 16.

Cylinder 18 is open at its bottom end and is supported upon tube structure 16 by means of a stud 19 secured in the top of the tube and passing through the top wall of the cylinder. Between the tube and cylinder is a coil spring 20 which urges the cylinder upwardly away from the tube, this movement being opposed by a thumb nut 21 screwed upon stud 19 outside the top wall of the cylinder. It will be apparent that manual adjustment of the thumb nut will result in vertical movement of the cylinder whereby the lower end thereof is made to move toward or away from the central portion of baffle 14 to adjust the dimensions of the open space between them. The top end of the cylinder is provided with an outlet duct 18′ shown closed by a cap 18″ for a purpose to be described.

Baffle 14 forms a continuous surface surrounding the tube 16 and is arcuate in section so as to extend downwardly and outwardly from the tube toward the wall of the tub 10. A screen 14′ is disposed so as to cover the space between the outer edge of baffle 14 and the wall of the tub and permit circulation of water from the washing compartment to the sump for recirculation through the pump 22, said screen 14′ being located adjacent the periphery of the tub and affording a sufficiently extensive and retarded circulation area to preclude any undesirable diversion of the circulating clothes thereto.

Disposed within the tube is an impeller 22 extending substantially from the bottom of the tub to the top of the tube. The impeller is affixed to a vertical shaft 22′, the upper end of which is journalled in a suitable bearing 23 formed in the tube structure. The lower end of the shaft passes through an adjustable gland 24 disposed in the bottom of the tub and a bearing formed in a housing structure 26, to have connection, through a suitable coupling 27, with the shaft of a motor 27′.

Housing 26 is herein shown as secured to and supported by the bottom wall of the tub and the motor 28 as supported upon the housing by means of a bracket structure 29. It is to be understood that any other suitable means of housing and supporting may be used.

Figure 2:
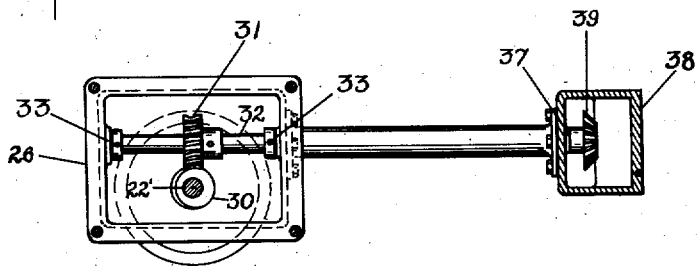
Fig. 2 is a sectional plan view taken on line 2—2 in Fig. 1.
Figure 3:
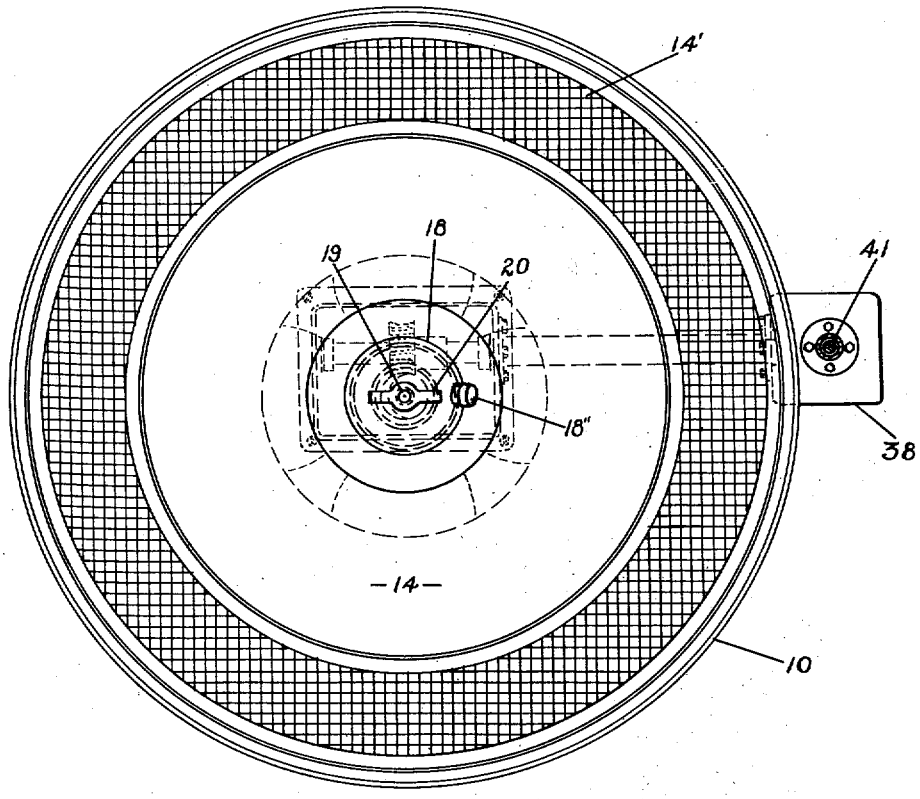
Fig. 3 is a plan view of my device as the same would appear ready for practical use.

Secured to shaft 22′, within housing 26 is a worm 30 which, as best shown in Fig. 2, meshes with a worm gear 31 mounted upon a shaft 32. Shaft 32 is journalled in bearings 33 formed in the walls of housing 26 and its outboard end is journalled in a bearing 37 formed in a housing structure 38 supported upon the skirt structure 11 as shown. The outer end of the shaft carries an affixed gear 39 meshing with a gear 40 attached to a vertical shaft 41 which is journalled at its lower end in a bearing 42 formed in the wall of housing 38.

The purpose of the mechanism just described is to provide a power take off connection between the driven shaft 22 and shaft 41, which latter is adapted to drive an associated wringer mechanism not shown.

It will be noted that the depressed bottom of the tub forms a sump below baffle 14 and screen 14′ and that the screen forms a barrier which permits water to flow freely to the sump and pump but prevents garments from entering the area.

It is further to be noted that any suitable form of water projecting device may be utilized in place of the auger form of impeller shown. The intention is to force water under pressure into a lower part of the tub to bring about the action noted and this may obviously be accomplished by any suitable pumping apparatus.

In operation, the impeller 22 is rotated at a relatively high rate of speed, which forces water upwardly in tube 16 to discharge therefrom through openings 17 into cylinder 18 and thence through the opening between the lower edge of the cylinder and baffle 14, over the baffle and into the upper portion of the tub.

In flowing outwardly over the arcuate baffle the discharged water imparts corresponding outward movement to the water at the bottom of the washing compartment, the outwardly flowing water being deflected upwardly, as indicated by the arrows in Fig. 1, as it nears the surrounding wall of the tub or receptacle 10 so as to carry any clothes in that vicinity over and upwardly from the screen 14′ through which, it is to be understood, some of the water is diverted downwardly into the sump to maintain circulation through the pump 22.

It will be apparent from the above that the injecting of the water from the pump or impeller 22 outwardly over the baffle or deck 14 produces in the body of the liquid within the tub or receptacle 10, an outwardly flowing current immediately above said baffle or deck, which said current imparts to the liquid thereabove an annular radially revolving movement in the direction indicated by the arrows in Fig. 1 so that the water above the water jet or current from the pump 22 becomes a vortex like turbulent mass with inner concentration and outer diffusion zones at the center and outer wall respectively of the tub or receptacle and clothes within the receptacle are caused to circulate over and over in radial cycles with the water which tends to carry the clothes downwardly through the central concentration zone around the cylindrical member or center column 18, then outwardly at or near the bottom of the washing compartment, then upwardly along the receptacle wall through the diffusion zone of the turbulent mass, and then inwardly at or near the top of the radially revolving turbulent mass to the concentration zone, this cycle of clothes or fabric movement being repeated and continued as long as the pump 22 is in operation.

It will also be apparent that the agitative action may conveniently be modified in intensity by means of adjustment of the thumb nut 21 whereby the gap at the lower end of cylinder 18 is restricted or widened to alter the velocity with which the water is projected into the tub.

When it is desired to remove the water from the tub, the cylinder 18 may be set down into contact with baffle 14, by means of the thumb nut 21, to prevent the water from flowing into the tub. The cap 18″ is next removed and a hose connection made to outlet duct 18′. Operation of the pump will thereupon force water through the outlet duct whereby the tub may be emptied.

I have herein shown and described an embodiment of my invention. Modifications of structure are obviously possible without alteration of principle. I do not wish to be limited in structure or function except within the scope of the appended claims, it being understood that while my washing machine and method are particularly useful in washing operations for cleansing, the term washing herein is not necessarily limited to cleansing but includes operations or treatments in which the washing action of the liquid is utilized for other purposes.

I claim as my invention:

1. In a washing machine, the combination of a tub adapted to contain a body of liquid, a baffle plate extending transversely of the tub axis and lying adjacent to but separated from the bottom of the tub and having its periphery adjacent to but spaced from the wall of the tub, a perforate member extending between the baffle and tub wall, said baffle and perforate member forming a barrier between the upper and bottom portions of the tub, the normal liquid line being substantially above said baffle, pump mechanism to continuously take liquid from said bottom portion and deliver the same at a point above and substantially centrally of said baffle, means to thereafter direct said liquid over the top surface of the baffle outwardly toward the wall of the tub, whereby two cycles of movement of water are caused, a first cycle consisting of continuous movement of water successively through the pump, over said baffle and downwardly through said perforate member into said lower portion of the tub, thence into the pump, and a second cycle consisting of movement of liquid outwardly over said baffle toward the tub wall, upwardly therealong, inwardly toward the center of the tub, thence downwardly toward and outwardly over said baffle.

2. In a washing machine the combination of a tub adapted to contain a body of liquid, a sump in the bottom of the tub, a transverse barrier comprising a perforate and imperforate member located above the sump, pump means adapted to take liquid from said sump and deliver the same within the tub directly upon the surface of said barrier, and to thereafter direct it outwardly toward the wall of the tub at a point adjacent the bottom of the tub, said pump continuously moving liquid from the sump, into the tub, over the baffle thence into the sump, as a result of which movement the body of liquid is caused to have a circulatory movement over said baffle toward the wall of the tub, upwardly therealong toward the surface of the liquid, thence inwardly toward the center of the tub and downwardly toward and again over said baffle.

3. A washing machine capable of washing garments while the same are wholly suspended in liquid without contact with moving parts comprising a liquid holding tub, pump means having an inlet for withdrawing liquid from the bottom area of the tub and having an outlet centrally of the liquid, said outlet being disposed a substantial distance below the surface of the liquid, means to direct the liquid from the outlet downwardly and outwardly toward a side wall of the tub to cause under currents flowing away from the outlet toward the wall by which it is directed upwardly therealong toward the surface of the water and downwardly toward said outlet, thence repeating the described cycle of movement, the body of liquid being thus continuously circulated and agitated within the tub without contact of moving parts within the tub, as a result of which garments are continuously agitated and circulated in the water while being suspended therein.

4. In a washing machine, a liquid holding tub, means to conduct the liquid in said tub upwardly, centrally of the tub, means surrounding said first means for thereafter directing said liquid downwardly in a confined annular sheet, means to conduct the liquid in currents from said last means downwardly and outwardly to the side wall of the tub, upwardly thereof and then inwardly towards the axial center and downwardly, and means to conduct the liquid to said first means.

5. In a washing machine a liquid holding tub, a sump formed in the bottom of the tub, a transverse barrier located above the sump, means associated with said sump for forcibly delivering liquid therefrom to the upper surface of and centrally of said barrier, being so shaped as to direct the pumped liquid in current downwardly and outwardly to the side wall, up the wall and then from the wall, inwardly and downwardly and means to continuously conduct liquids from the barrier to the sump.

6. A washing machine, a tub, means to divide the tub into an upper and a lower portion, comprising a member having an outer perforate part and an inner imperforate part, a rotary pump extending upwardly through said last part and having an inlet communicating with said lower portion, means to direct the liquid from said pump downwardly against said imperforate part in an annular sheet and means to direct the liquid in currents from said annular sheet downwardly and outwardly over said member up said wall, inwardly toward the axial center and downwardly.

7. In a washing machine the combination of a tub adapted to contain a body of liquid, a sump in the bottom of the tub, a transverse barrier comprising a perforate and imperforate member located above the sump, pump means adapted to take liquid from said sump and deliver the same within the tub directly upon the upper surface of said barrier, and to thereafter direct it outwardly toward the wall of the tub at a point adjacent the bottom of the tub, said pump continuously moving liquid from the sump, into the tub, over the baffle thence into the sump, as a result of which movement the body of liquid is caused to have a circulatory movement over said baffle toward the wall of the tub, upwardly therealong toward the surface of the liquid, thence in direction away from the tub wall and downwardly toward and again over said baffle.

8. In a washing machine the combination of a tub adapted to contain a body of liquid, a sump in the bottom of the tub, a transverse barrier comprising a perforate and imperforate member located above the sump, pump means adapted to take liquid from said sump and deliver the same within the tub directly upon the surface of said barrier, and to thereafter direct it outwardly toward the wall of the tub at a point adjacent the bottom of the tub, said pump continuously moving liquid from the sump, into the tub, over the baffle thence into the sump, as a result of which movement the body of liquid is caused to have a circulatory movement over said baffle toward the wall of the tub, upwardly therealong toward the surface of the liquid, thence inwardly toward the center of the tub and downwardly toward and again over said baffle, all in such a manner that garments placed in the water are caused to move with the water during its circulatory movement whereby they are agitated in the water while at the same time being suspended therein.

9. In a washing machine, the combination of a tub adapted to contain a body of liquid, a baffle plate extending transversely of the tub axis and lying adjacent to but separated from the bottom of the tub and having its periphery adjacent to but spaced from the wall of the tub, a perforate member extending between the baffle and tub wall, said baffle and perforate member forming a barrier between the upper and bottom portions of the tub, the normal liquid line being substantially above said baffle, pump mechanism to continuously take liquid from said bottom portion and deliver the same at a point above and substantially centrally of said baffle, means to thereafter direct said liquid over the top surface of the baffle outwardly toward the wall of the tub, whereby two cycles of movement of water are caused, a first cycle consisting of continuous movement of water successively through the pump, over said baffle and downwardly through said perforate member into said lower portion of the tub, thence into the pump, and a second cycle consisting of movement of liquid outwardly over said baffle toward the tub wall, upwardly therealong, inwardly toward the center of the tub, thence downwardly toward and outwardly over said baffle whereby garments placed in the liquid are agitated in suspension in the liquid as a result of the second mentioned cycle of movements.

10. In a washing machine the combination of a tub adapted to contain a body of liquid, a sump in the bottom of the tub, pump means in the tub adapted to take liquid from said sump and deliver the same under pressure within the tub at a point spaced from the wall and substantially below the level of the liquid, means to direct the liquid outwardly from said point in a line substantially parallel with the surface of the liquid and toward the wall of the tub, said pump continuously moving liquid from the sump, into the tub as aforesaid and into the sump, as a result of which movement the body of liquid is caused to have a circulatory movement away from said point of delivery toward the wall of the tub, upwardly therealong toward the surface of the liquid thence in direction away from the tub wall and downwardly toward and again away from said point of delivery, and means enabling said pump to force liquid out of the tub.

11. In a machine for treating articles of fabric or the like in a body of liquid, the combination with a liquid-holding receptacle having an outer annular zone and an inner annular zone of smaller cross sectional area than the outer zone, of means for injecting a jet of liquid into a bottom portion of the smaller zone radially outward therefrom across a bottom portion of the receptacle into the outer zone, thereby creating an upward flow along the upright wall of the outer zone, thence inwardly across an upper portion of the receptacle from the larger zone to the smaller zone and thence downwardly through the smaller zone into the incoming jet of liquid, thereby creating a cyclic flow in a body of liquid contained in the receptacle and in a plurality of upright radial planes converging from said larger zone to said smaller zone, the bottom of the receptacle being provided with an annular outlet located at the bottom of the larger zone, and an annular by-pass communicating between said annular outlet and the inlet of the injection means, the path of the cyclic flow of the liquid and fabric articles being free from moving mechanical parts of the injection means.

12. In a machine for treating articles of fabric or the like in a body of liquid, the combination of a liquid-holding receptacle having an outer upright peripheral wall and an inner upright peripheral wall, means for injecting a jet of liquid into the receptacle radially across the bottom thereof from one wall to the other wall for creating a flow along one upright wall and thence across to the other upright wall and thence along said latter upright wall into the incoming jet of liquid, thereby to create a cyclic flow in a body of liquid in the receptacle in a plurality of upright radial planes converging from the outer wall towards the inner wall, the bottom of the receptacle being provided with an annular outlet located remote from the discharge of the injection means, and a by-pass leading from the said annular outlet to the inlet of the injection means, the path of cyclic flow of the liquid and fabric articles being free from moving mechanical parts of the injection means.

13. In a machine for treating articles of fabric or the like in a body of liquid, the combination of a liquid-holding receptacle having an outer upright peripheral wall and an inner upright peripheral wall, means for injecting a jet of liquid into the receptacle radially across the bottom thereof from the inner wall to the outer wall for creating an upward flow along the upright outer wall, thence inwardly across an upper portion of the receptacle from the outer wall to the inner wall, and thence downwardly into the incoming jet of liquid, thereby creating a cyclic flow in a body of liquid contained in the receptacle and in a plurality of upright radial planes converging from the outer wall to the inner wall, the bottom of the receptacle being provided with an annular outlet located adjacent the outer peripheral wall, and an annular by-pass communicating between said annular outlet and the inlet of the injection means, the path of cyclic flow of the liquid and fabric articles being free from moving mechanical parts of the injection means.

14. In a machine for treating fabrics or the like in a body of liquid, the combination of a liquid holding receptacle having therein a compartment for the fabrics which is devoid of exposed liquid impelling means, a liquid impeller inaccessible to the fabrics in the compartment and operable to force liquid centrally into the bottom of the compartment, means centrally in the compartment adjacent the bottom thereof and associated with the liquid impeller and by which the impelled liquid is confined for localized discharge at the bottom of the compartment, said means having a substantially annular outlet from which the confined liquid is directed radially outward to produce therefrom an annular undercurrent at the bottom of the liquid in the compartment and flowing radially outward toward the surrounding wall of the compartment at a velocity to cause the liquid thereabove to become a radially revolving field of turbulence, and means under the said compartment communicating with the compartment and impeller to provide a by-pass through which liquid is returned from the compartment to the impeller.

15. In a machine for treating articles of fabric or the like in a body of liquid, the combination with a liquid-holding receptacle having an outer annular zone and an inner annular zone of smaller cross sectional area than the outer zone, of means for injecting a jet of liquid radially across an end portion of the receptacle from one zone to the other zone, thereby creating a flow longitudinally through a zone, thence radially across the opposite end portion of the receptacle to the other zone, and thence longitudinally through said other zone into the incoming jet of liquid, thereby creating a cyclic flow in a body of liquid contained in the receptacle and in a plurality of upright radial planes converging from one zone to the other zone, the bottom of the receptacle being provided with an annular outlet located at the bottom of one of the zones, and an annular by-pass communicating between said annular outlet and the inlet of the injection means, the path of the cycle of the liquid and fabric articles being free from moving mechanical parts of the injection means.

16. In a machine for treating articles of fabric or the like in a body of liquid, the combination of a receptacle having therein a compartment for the fabrics which is devoid of exposed liquid impelling means and has a horizontally curved side wall, jet means in the compartment at the center of curvature of said side wall, a by-pass communicating with the compartment along said side wall and leading therefrom to said jet means, a liquid impeller inaccessible to the fabrics in the compartment and operable to withdraw liquid into the by-pass from the compartment along said side wall and discharge same through the jet means, said jet means having orifice means which is concentric with and spaced from said side wall and of a shape to convert the liquid discharge from the jet means into a high velocity relatively thin stream which is directed radially outward toward said curved side wall substantially uniformly throughout the length of curvature thereof.

17. In a machine for treating articles of fabric or the like in a body of liquid, the combination of a receptacle having therein a compartment for the fabrics which is devoid of exposed liquid impelling means and has a surrounding side wall, jet means centrally disposed in the compartment, a by-pass communicating with the compartment along said side wall and leading therefrom to said jet means, a liquid impeller inaccessible to the fabrics in the compartment and operable to withdraw liquid into the by-pass from the compartment along said side wall and discharge same through the jet means, said jet means having annular orifice means that is concentric with and spaced from said side wall and of a shape to convert the liquid discharge from the jet means into a high velocity relatively thin substantially continuous annular stream which is directed radially outward toward said annular side wall substantially uniformly throughout the circumferential length thereof.

18. In a machine for treating articles of fabric or the like in a body of liquid, the combination of a receptacle having therein a compartment for the fabrics which is devoid of exposed liquid impelling means and has a surrounding side wall, jet means centrally disposed in the compartment, a by-pass communicating with the compartment along said side wall and leading therefrom to said jet means, a liquid impeller inaccessible to the fabrics in the compartment and operable to withdraw liquid into the by-pass from the compartment along said side wall and discharge same through the jet means, said jet means having annular orifice means that is concentric with and spaced from said side wall and of a shape to convert the liquid discharge from the jet means into a high velocity relatively thin substantially continuous annular stream, and annular deflecting means against which the annular stream is directed from said orifice means and cooperable therewith to direct said annular stream radially outward toward said annular side wall substantially uniformly throughout the circumferential length thereof.

19. In a machine of the class described for treating articles of fabric or the like, the combination of a tub adapted to contain a body of liquid and having a bottom wall and an annular side wall, central jet means in the tub having annular substantially continuous orifice means, an imperforate wall below the orifice means and extending outwardly therefrom toward the annular wall and spaced from the bottom wall of the tub to form between said imperforate wall and said bottom wall a sump which intercommunicates along said annular wall with the tub above the sump, and a liquid impeller operable to withdraw liquid from the tub along said annular wall into the sump and return same through the jet orifice means into the tub above and outward along said imperforate wall.

20. The herein described method of treating fabric articles which comprises the steps of immersing the articles in a body of liquid, hydraulically revolving the liquid radially within a zone free of moving mechanical liquid circulating means thereby creating a corresponding substantially uniform cyclic flow of the liquid throughout the zone in a plurality of upright planes extending radially from a common vertical axis and establishing in said zone small and large areas concentric with and respectively adjacent to and remote from said vertical axis, and circulating the fabric articles with the liquid alternately through said small and large areas thereby compressing the articles in the small area and distending them in the large area, the aforesaid revolving of the liquid being accomplished by applying a substantially continuous annular sheet of liquid at high velocity superficially to the revolving body of liquid in the direction of rotation thereof and substantially uniformly throughout a surface area thereof concentric with said vertical axis.

21. The herein described method of treating fabric articles which comprises the steps of immersing the articles in a body of liquid, hydraulically revolving the liquid radially within a zone free of moving mechanical liquid circulating means thereby creating a corresponding substantially uniform cyclic flow of the liquid throughout the zone in a plurality of upright planes extending radially from a common vertical axis and establishing in said zone small and large areas concentric with and respectively adjacent to and remote from said vertical axis, circulating the fabric articles with the liquid alternately through said small and large areas thereby compressing the articles in the small area and distending them in the large area, the aforesaid revolving of the liquid being accomplished by applying liquid at high velocity superficially to the revolving body of liquid in the direction of rotation thereof and substantially uniformly throughout a surface area thereof concentric with and extending radially from said vertical axis.

22. The herein described method of treating fabric articles which comprises the steps of immersing the articles in a body of liquid, hydraulically revolving the liquid radially within a zone free of moving mechanical liquid circulating means thereby creating a corresponding substantially uniform cyclic flow of the liquid throughout the zone in a plurality of upright planes extending radially from a common vertical axis and establishing in said zone small and large areas concentric with and respectively adjacent to and remote from said vertical axis, circulating the fabric articles with the liquid alternately through said small and large areas thereby compressing the articles in the small area and distending them in the large area, the aforesaid revolving of the liquid being accomplished by obtaining liquid substantially entirely at said large area and applying same at high velocity superficially to the revolving body of liquid in the direction of rotation thereof and substantially uniformly throughout a surface area thereof concentric with said vertical axis.

WILLIAM ROCKE.